United States Patent Office 3,322,569

Patented May 30, 1967

1

2

3,322,569

TREATMENT OF CELLULOSIC TEXTILES WITH A CREASE RESISTING FINISH AND A COPOLYMER OF A N-METHYLOLAMIDE OF AN ACRYLIC ACID FOR THE PURPOSE OF REDUCING WET SOILING

Gerhard Faulhaber and Dieter Voges, Mannheim, and Ernst Penning, Hans Wilhelm, and Norbert Goetz, Ludwigshafen (Rhine), Germany, assignors to Badische Anilin- & Soda-Fabrik Aktiengesellschaft, Ludwigshafen (Rhine), Germany No Drawing. Filed Nov. 5, 1963, Ser. No. 321,415
Claims priority, application Germany, Nov. 10, 1962, B 69,575
8 Claims. (Cl. 117—139.4)

This invention relates to textiles having a finish which improves crease resistance and reduces the tendency of the textiles to soil during washing.

It is known that textiles of cellulosic fibers, alone or mixed with other natural or with synthetic fibers, can be treated with compounds which improve the crease resistance of the fabric and with copolymers of N-methylolamides of an acrylic acid and one or more other polymerizable compounds. The treated textiles thus acquire various excellent properties, for example tear resistance, abrasion resistance, resistance to trichloroethylene and retention of textile character. It has been found in some cases, however, that the textiles tend to become irreversibly soiled during washing with hot aqueous liquids. We call this wet soiling.

The main object of this invention is to provide textiles consisting of or containing cellulose which have good finish effects and diminished or negligible tendency to become soiled during washing. By "finish effects" we understand particularly crease resistance, but also tear resistance, abrasion resistance and handle. Other objects will become apparent from the following detailed description.

The objects are achieved by using for the treatment of the textile consisting of or containing cellulose, in addition to a compound which improves crease resistance, a copolymer which has been prepared from 1 to 10% by weight of a N-methylolamide of an acrylic acid, 0.5 to 10% by weight of at least one compound containing at least two polymerizable double bonds in the molecule and the balance of 100% by weight of one or more other polymerizable compounds.

Examples of compounds having at least two polymerizable double bonds are: divinylbenzene and its derivatives and substitution products; glycol diacrylates and glycol dimethacrylates, as for example ethylene glycol diacrylate and butanediol dimethacrylate; esters of ethylenically unsaturated polymerizable carboxylic acids and polyhydric alcohols, such as glycerol triacrylate; vinyl esters and allyl esters of ethylenically unsaturated polymerizable carboxylic acids, such as vinyl methacrylate and allyl acrylate; amide derivatives of ethylenically unsaturated carboxylic acids, such as methylene bis-acrylamide.

N-methylolacrylamide and N-methylolmethacrylamide are suitable N-methylolamides of acrylic acids.

Esters of acrylic acid and of methacrylic acid are preferred as the further polymerizable compounds, for example the methyl, ethyl, propyl and butyl esters and mixtures of these esters. The following are examples of copolymers coming within the scope of this invention: copolymers prepared using butyl acrylate, N-methylolacrylamide or/and N-methylolmethacrylamide and butanediol diacrylate; copolymers prepared using butyl acrylate, N-methylolacrylamide or/and N-methylolmethacrylamide, hexanediol diacrylate and if desired methyl methacrylate; copolymers prepared using butyl acrylate, acrylonitrile, methylol methacrylamide and triacryloformal; examples of other monomers which may be used for the production of copolymers suitable for treating textiles according to the invention are isopropyl acrylate, ethyl acrylate, N-dibutylacrylamide, ethylhexyl acrylate, methyl methacrylate and vinylpyrrolidone. Examples of other suitable components in the copolymers may be found in the German printed application No. 1,110,606, in French patent specification No. 1,273,831 and in U.S. application Ser. No. 69,540, filed Nov. 16, 1960, by Wilhelm Ruemens, Herbert Tulo, Norbert Goetz and Rolf Zeidler, now U.S. 3,220,869.

The said patent literature also contains recommendations of suitable crease resistant finishes. Examples are methylol compounds of urea, diphenylurea, methylurea, thiourea, dicyandiamide, guanidine, melamine, methylmelamine, phenylmelamine, glyoxal monoureine and diureine, urethanes, polyurethanes, lactams, polyamides, triazinones, carboxylic amides and carboxylic diamides. Esterified methylol compounds of the said substances are also suitable, and also the initial materials leading to the methylol compounds. Methylol compounds free from nitrogen may also be used, for example those of ketones, such as acetone, and acetals. Epoxy compounds and water-soluble polymers and copolymers of amides of unsaturated carboxylic acids are also suitable, as well as mixtures of all the said compounds.

The textiles are generally treated with mixtures of the crease resistant finishes and the copolymers in aqueous solution or dispersion. Mixtures of two or more crease resist finishes and two or more copolymers of which at least one satisfies the conditions given above, may be used. The concentration in the treatment liquor (treatment bath) of crease resist finish may be about 30 to about 150 g./l., preferably 40 to 80 g./l., and the concentration of copolymer about 5 to about 100 g./l., preferably 10 to 40 g./l. Generally speaking the fabric is padded with the liquor and squeezed out to 100%, i.e. 3 to 15% by weight, preferably 4 to 8% by weight of crease resist finish and 0.5 to 10% by weight, preferably to 4% by weight of copolymer with reference to the dry fabric to be treated. The material thus treated is then exposed to conditions which cause fixation of the treatment agent on the fiber. This usually involves high temperatures and/or acid condensation catalysts. More detailed information may be obtained from the above-mentioned patent literature and from German printed application No. 1,128,397 and said U.S. 3,220,869.

The fabric may also be treated successively in any sequence with a solution or dispersion of the crease resist finish and with a solution or dispersion of the copolymer, excess liquid being removed by squeezing before and after the second impregnation. The method, which may be termed a two-bath method, is more troublesome and less economical in practice than the one-bath method.

The terms aqueous solution and aqueous dispersion are intended to include liquors which contain as the liquid not only water but also organic liquids, as for example ethyl alcohol or glycerol.

The condensation catalysts may already be present in the treatment liquors provided they do not develop their catalytic action until they are heated. The treatment liquors may also contain other agents suitable for textile finishing, as for example softeners which improve feel, water repellents or coloring pigments.

Particularly for the production of white washing, a lessened tendency to soil during washing represents a considerably technical advance. It could not be foreseen that by incorporating a small amount of the said polyfunctional compounds into the copolymers to be used in conjunction with the crease resist finishes, a textile finish would be obtained having a diminished tendency for wet soiling.

The fabric to be treated according to this invention may contain or consist of cellulose. Cellulose includes particularly cotton, but also other natural cellulose, such as linen, and regenerated cellulose. Union fabrics may contain not only cellulose fibers but also fibers of polyamides, linear polyesters, cellulose esters or acrylonitrile polymers.

The invention in further illustrated by the following examples. The parts in the examples are parts by weight.

*Example 1*

Mercerized and bleached cotton poplin cloth is impregnated with a liquor containing, in 1000 parts of water, 40 parts of dimethylolpropylene-urea, 60 parts of a 40% aqueous dispersion of a copolymer of 90 parts of butyl acrylate, 5 parts of N-methylolmethacrylamide and 5 parts of butanediol diacrylate and 15 parts of magnesium chloride. The cloth is squeezed out, dried and heated for five minutes at 150° C. Samples of the impregnated cloth are exposed for fifteen minutes to the action of a suspension of 0.5 g. of carbon black per liter at 70°, 80° and 90° C. After the samples have been rinsed with clear water they are dried and then subjected to washing at the boil with a conventional household detergent.

If a cloth which has been treated under otherwise the same conditions but with a copolymer of 95 parts of butyl acrylate and 5 parts of N-methylolmethacrylamide, is treated in the same way as the above samples, comparison of the samples makes the technical superiority of the finish according to this invention particularly evident. The soiling which remains after washing at the boil in the case of the fabric finished according to this invention is far less than in the case of the fabric finished by the prior art method.

*Example 2*

A bleached cotton cloth (plain weave) is impregnated with a liquor containing, in 1000 parts of water, 70 parts of dimethylolethylene-urea, 50 parts of a 42.5% aqueous dispersion of a copolymer of 75 parts of butyl acrylate, 4 parts of N-methylolacrylamide, 6 parts of hexanediol diacrylate and 15 parts of methyl methacrylate, 3 parts of the adduct of isooctylphenol and 6 moles of ethylene oxide and also 20 parts of magnesium chloride. The cloth is squeezed out, dried and heated for five minutes at 145° C. If the cloth thus impregnated is exposed for fifteen minutes to the action of a suspension of 0.5 g. of carbon black per liter at 70°, 80° and 90° C., rinsed with clear water, dried and then washed at the boil, a cloth is obtained which is clearly less stained than a cloth which has been treated in the same way with a similar dispersion which does not contain hexanediol diacrylate.

*Example 3*

A bleached cotton cloth (basket weave) is impregnated with a liquor which contains, in 1000 parts of water, 80 parts of N-isobutylhexahydrotriazone, 45 parts of a 40% aqueous dispersion of a copolymer of 90 parts of butyl acrylate, 2.5 parts of acrylonitrile, 5 parts of N-methylolmethacrylamide and 3.5 parts of triacryloformal and 3 parts of the adduct of 7 moles of ethylene oxide to 1 mole of oleic acid monoethylolamide and 12 parts of zinc nitrate. If the cloth thus finished is squeezed out, dried and heated for six minutes at 135° C. and given a further treatment as in Example 2, a cloth is obtained which has a clearly higher degree of whiteness than a cloth treated in the same way but which has been finished with a similar dispersion which does not contain triacryloformal.

*Example 4*

A cotton satin cloth printed with vat dyes is impregnated with a liquor containing, in 1000 parts of water, 65 parts of dimethylolglyoxalmonoureine, 35 parts of a 38% aqueous dispersion of a copolymer of 50 parts of n-butyl acrylate, 15 parts of isopropyl acrylate, 15 parts of ethyl acrylate, 2 parts of dibutylacrylamide, 3 parts of N-methylolmethacrylamide, 1 part of the butyl ester of N-methylolmethacrylamide, 4 parts of glycol diacrylate and also 5 parts of monoammonium phosphate. The cloth is squeezed out, dried to 8% residual moisture, calendered at 190° C. on a Schreiner calender and then heated for four minutes at 155° C. The carbon black test (described in Example 1) shows that the white ground of the printed cloth is considerably less stained than that of a cloth which has been treated in the same way but with a dispersion which contains no glycol diacrylate.

*Example 5*

A bleached rayon staple cloth (plain weave) is impregnated with a liquor which contains, in 1000 parts of water, 100 parts of dimethylolurea, 20 parts of dimethylolurea dimethyl ether, 60 parts of a 40% aqueous dispersion of a copolymer of 40 parts of ethyl acrylate, 30 parts of ethylhexyl acrylate, 20 parts of methyl methacrylate, 5 parts of N-methylolmethacrylamide, 5 parts of butanediol diacrylate and also 4 parts of ammonium nitrate and 3 parts of ammonium acetate. After the cloth has been squeezed out, dried and heated for four minutes at 160° C., there is again obtained in a comparative treatment a finished cloth which shows a clearly better white shade than a finished cloth which contains in the dispersion component of the finish either no butanediol diacrylate or no N-methylolmethacrylamide or none of either substance.

*Example 6*

A mercerized bleached cotton poplin cloth is impregnated with a liquor which contains, in 1000 parts of water, 30 parts of propanediol formal, 45 parts of dimethylolpropylene-urea, 40 parts of a 45% aqueous dispersion of a copolymer of 91 parts of butyl acrylate, 1 part of vinyl pyrrolidone, 3 parts of N-methylolmethacrylamide, 2 parts of N-methylolacrylamide, 2 parts of triacryloformal, 1 part of allyl acrylate, 2 parts of divinylbenzene and 3 parts of the adduct of nonylphenol to 7 moles of ethylene oxide and also 50 parts of magnesium chloride. The cloth is squeezed out and dried and then heated for two minutes at 175° C. This cloth also has a better degree of whiteness than a cloth which has been finished with a similar dispersion whose copolymer contains no monomers having two or more double bonds.

We claim:

1. In a process of finishing a textile fabric which contains at least 25% by weight of cellulosic fibers wherein said fabric is treated with (a) up to about 15% by weight of a finishing compound which improves the crease resistance of said fabric, and (b) up to about 10% by weight of an addition copolymer of a N-methylolamide of an acrylic acid and at least one other monoolefinically unsaturated compound, said percentages being with reference to the dry weight of the celluloisic fabric being treated, and said treated cellulosic fabric is then cured at a temperature and for a period of time sufficient to fix components (a) and (b) thereto, the improvement for reducing wet soiling of the finished fabric which comprises:

carrying out said process while using as component (b) an addition copolymer formed from (1) about 1 to 10% by weight of a N-methylolamide of a compound selected from the class consisting of acrylic acid and methacrylic acid, (2) about 0.5 to 10% by weight of a compound selected from the class consisting of divinylbenzenes, glycol diacrylates, glycol methacrylates, glycerol triacrylate, vinyl methacrylate, allyl acrylate and methylene bis-acrylamide, and (3) about 80 to 98.5% by weight of a compound selected from the class consisting of the methyl, ethyl, propyl and butyl esters of acrylic and methacrylic acid.

2. A process as claimed in claim 1 wherein component (b)(2) is butanediol diacrylate.

3. A process as claimed in claim 1 wherein component (b)(2) is hexanediol diacrylate.

4. A process as claimed in claim 1 wherein component (b)(2) is ethylene glycol diacrylate.

5. A process as claimed in claim 1 wherein said fabric contains applied thereto about 3 to 15% by weight of the crease resistant finish (a) and about 0.5 to 10% by weight of the copolymer (b), percentages with reference to the dry weight of the fabric being treated.

6. A process as claimed in claim 1 wherein component (a) is dimethylolethylene-urea.

7. A process as claimed in claim 1 wherein component (a) is dimethylolglyoxalmonoureine.

8. The fabric which is resistant to creasing and wet soiling as obtained by the process of claim 1.

References Cited

UNITED STATES PATENTS

| | | | |
|---|---|---|---|
| 2,731,364 | 1/1956 | Reibnitz et al. | 117—139.4 X |
| 2,897,101 | 7/1959 | Graulich et al. | 117—139.5 |
| 2,984,588 | 5/1961 | Graulich et al. | 117—161 |
| 3,220,869 | 11/1965 | Ruemens et al. | 117—11 |

WILLIAM D. MARTIN, *Primary Examiner*.

T. G. DAVIS, *Assistant Examiner*.

UNITED STATES PATENT OFFICE
CERTIFICATE OF CORRECTION

Patent No. 3,322,569 May 30, 1967

Gerhard Faulhaber et al.

It is hereby certified that error appears in the above numbered patent requiring correction and that the said Letters Patent should read as corrected below.

Column 2, line 41, after "preferably" insert -- 1 --.

Signed and sealed this 22nd day of October 1968.

(SEAL)
Attest:

Edward M. Fletcher, Jr.
Attesting Officer

EDWARD J. BRENNER
Commissioner of Patents